United States Patent [19]

Ostrup et al.

[11] Patent Number: 4,974,402
[45] Date of Patent: Dec. 4, 1990

[54] HARVESTING AGGREGATE

[75] Inventors: Heinrich Ostrup, Harsewinkel; Lambert Sanders, Herzebrock-Clarholz; Heribert Dudler, Harsewinkel, all of Fed. Rep. of Germany

[73] Assignee: Claas OHG, Fed. Rep. of Germany

[21] Appl. No.: 460,311

[22] Filed: Jan. 3, 1990

[30] Foreign Application Priority Data

Jan. 16, 1989 [DE] Fed. Rep. of Germany ....... 3901069
Sep. 14, 1989 [DE] Fed. Rep. of Germany ....... 3930777

[51] Int. Cl.⁵ ............................................. A01D 41/04
[52] U.S. Cl. ............................................ 56/102; 56/95
[58] Field of Search ............... 56/102, 101, 12.1, 12.7, 56/13.5–13.7, 14.5, 17.1, 51, 53, DIG. 9, DIG. 16, DIG. 17, 77, 94–97

[56] References Cited
U.S. PATENT DOCUMENTS
3,448,566 6/1969 van der Lely .......................... 56/102

FOREIGN PATENT DOCUMENTS
0961594 10/1982 Fed. Rep. of Germany ........ 56/102
3610141 10/1987 Fed. Rep. of Germany .
3619691 12/1987 Fed. Rep. of Germany .
3635335 4/1988 Fed. Rep. of Germany .......... 56/95

Primary Examiner—Thuy M. Bui
Attorney, Agent, or Firm—Michael J. Striker

[57] ABSTRACT

A harvesting implement for harvesting of corn and other grain products, to be arranged in front of a harvester thresher, comprises a driven drawing roller having a substantially cylindrical main body and a plurality of impact plates provided with cutouts, a cutting block provided with cutting elements extending through the cutouts, and a counter holder associated with the drawing roller. The counter holder is formed as a driven counter roller which is axes parallel to the picking roller, the counter roller includes a main body with a plurality of segments spaced from one another, the drawing roller and the counter roller are both associated with the one common cutting block, the cutting elements of the cutting block include a plurality of cutters which extend simultaneously in the intermediate spaces between the segments of the counter roller and in the cutouts of the impact plates of the drawing roller.

15 Claims, 3 Drawing Sheets

HARVESTING AGGREGATE

BACKGROUND OF THE INVENTION

The present invention relates to a harvesting aggregate for harvesting of corn and other grain products, which is formed as a front implement of a harvester thresher.

More particularly, it relates to such a harvester aggregate which has a drawing device and a picking gap for separating cobs from plants, wherein for each plant row the implement is provided with a driven picking roller including a substantially cylindrical main body and a plurality of impact plates uniformly distributed over the main body and having cutouts, a cutting block mounted on the implement and having cutting means extending through the cutouts, and a counter holder associated with the drawing rollers.

Such a harvesting implement is disclosed for example in the German document DE-PS 3,619,691. The counter holder is formed here as a trough-shaped curved sheet which partially surrounds the drawing rollers over their whole length. The partial casing serves as a guiding sheet for the stalks which are engaged by the roller and drawn downwardly and then comminuted by the stationary cutter. It has been recognized from practice that frequently the stalk is not reliably engaged and pulled through. Moreover, the trough-shaped curved sheet which serves as a partial casing acts as a friction brake. Such friction brake consumes energy on the one hand, and also tears the stalk parts and folds them back because of the braking action. Instead of reaching the field they are transported to the threshing system.

SUMMARY OF THE INVENTION

Accordingly, it is an object of the present invention to provide a harvesting implement which avoids the disadvantages of the prior art.

More particularly, it is an object of the present invention to provide a harvesting implement of the above mentioned type, which in all harvesting conditions provides for a reliable engagement and pulling through of stalk parts to be comminuted.

In keeping with these objects and with others which will become apparent hereinafter, one feature of the present invention resides, briefly stated, in a harvesting implement in which the counter holder is formed as a driven roller extending axis-parallel to the picking roller and having a main body provided with a plurality of segments spaced from one another, the drawing roller and the counter roller are associated with a joint cutter block having a plurality of cutters, and the cutters of the cutting block extend simultaneously through the intermediate spaces between the individual segments of the counter roller and the cutouts of the impact plates of the drawing roller.

The engagement depth of the cutters into the cutouts of both rollers is performed in the manner which is disclosed in the German Patent Application P 3,610,141 of the applicant. When the harvesting implement is designed in accordance with the present invention, it eliminates the disadvantages of the prior art and provides for the above mentioned highly advantageous results.

In accordance with another advantageous feature of the present invention, the distance between the axes of the drawing roller and the counter roller are smaller than the sum of the radii of the circumferences of the drawing roller and the counter roller. Due to this, both rollers engage with one another and thereby provide for a high efficiency.

In accordance with a further advantageous feature of the present invention, each segment has at least three vanes with freely rotating vane parts serving for drawing in, and these freely rotating vane parts are inclined rearwardly relative to the rotary direction in an arcuate fashion. When the vanes are designed in accordance with this feature, the stalks are pressed in direction toward the picking roller and can be reliably comminuted.

In accordance with still a further feature of the present invention, both the picking roller and the counter roller each are provided with a front conical tip which carries helical sheets. This feature significantly improves the drawing-in or the receipt of the stalks.

Still another feature of the present invention is that the diameter of the circumference of the counter roller is smaller than the diameter of the circumference of the drawing roller. Also, in an advantageous manner the vertical central plane between the drawing roller and the counter roller is laterally offset toward the vertical central plane of the drawing roller. The cutter block is arranged on a common support and can be turned when necessary to exclude the chopping action as shown in a dotted line in FIG. 2.

In accordance with still a further feature of the present invention, the drawing roller with impact plates and the counter roller with vanes are driven so that the counter roller rotates with a higher rotary speed than the drawing roller. An advantageous ratio of the rotary speeds of the counter roller to the drawing roller is 4:3. With this ratio, two vanes of the counter roller engage in an intermediate space between the impact plates of the drawing roller in the region of intersection of the circumferences of the counter roller and the drawing roller. As a result, a reliable engagement of the stalk product and a firm pressing of the stalk product against the drawing roller is obtained.

In order to prevent catching the stalk product in the region of the freely rotating cutters between them and the main body of the counter roller or the main body of the drawing roller, the cutters are formed so that in the freely rotating region they correspond to the radius of the main body of the counter roller or the radius of the main body of the drawing roller.

Still another feature of the present invention is that the holder for the cutter block or the cutters is offset laterally outwardly toward the main body of the counter roller for preventing collisions with the stalk product.

Since here longer cutters are required, the invention provides for another feature in accordance with which each cutter has a reinforcing crease for preventing vibrations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
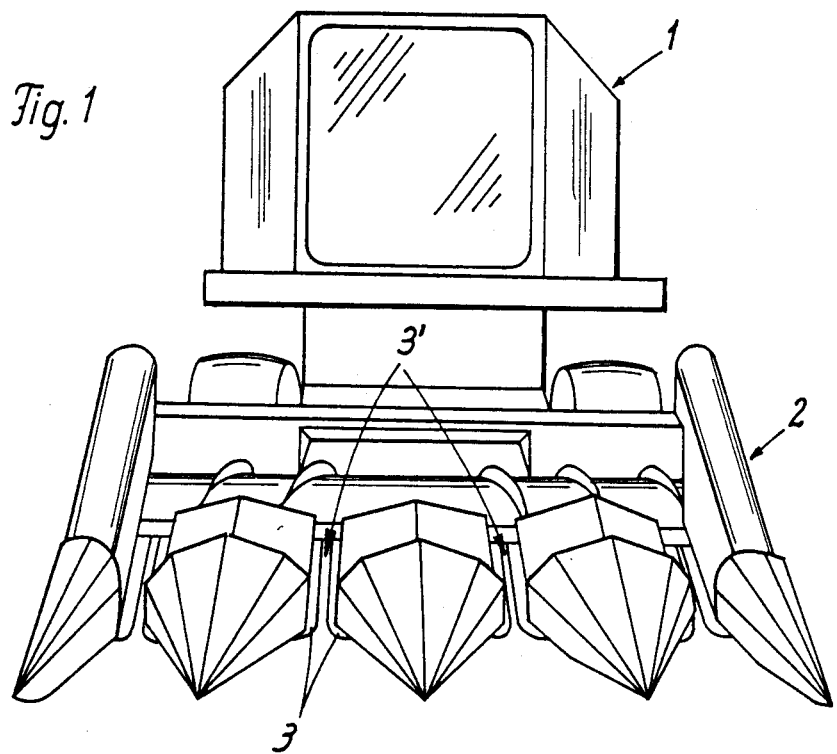
FIG. 1 is a view showing a harvesting implement with a corn picker in its front region in accordance with the present invention.

An agricultural machine in accordance with the present invention is a harvester thresher which is identified with reference numeral 1 and is provided at its front side with a corn picker 2. The corn picker 2 has four rows of pairs of conveyor chains 3 which pick corn stalks in a not shown manner.

Drawing rollers 4 are drivingly supported underneath each pair of the conveyor chains 3 and have parallel axes. In a known manner each drawing roller 4 has a cylindrical main body 6 and a plurality of impact plates 7 which are uniformly distributed over its periphery. The impact plates 7 are provided with cutouts 8. Cutters 9 of a cutter block 10 engage in the cutouts 8 of the impact plates 7.

The counter roller 5 is arranged above the cutter block 10. It also includes a cylindrical main body 11 and a plurality of segments 12 spaced from one another by distances 16 in an axial direction. Each of the segments 12 has three vanes. The vanes 13 of the segments extend in an arcuate fashion and inclined rearwardly relative to a direction of rotation identified with the arrow A. Thereby the stalk is pressed in direction toward the picking roller.

The axes of the counter roller and the drawing roller are identified with reference numerals 14 and 15. As can be seen from FIG. 3, the distance between the axes 14 and 15 of these rollers are smaller than the sum of the radii R 1 and R 2 of the peripheries of the rollers. Thereby a reliable drawing through of the stalk is performed under all conditions, due to permanent form-locking engagement between the rollers and the agricultural product.

Figure 2:
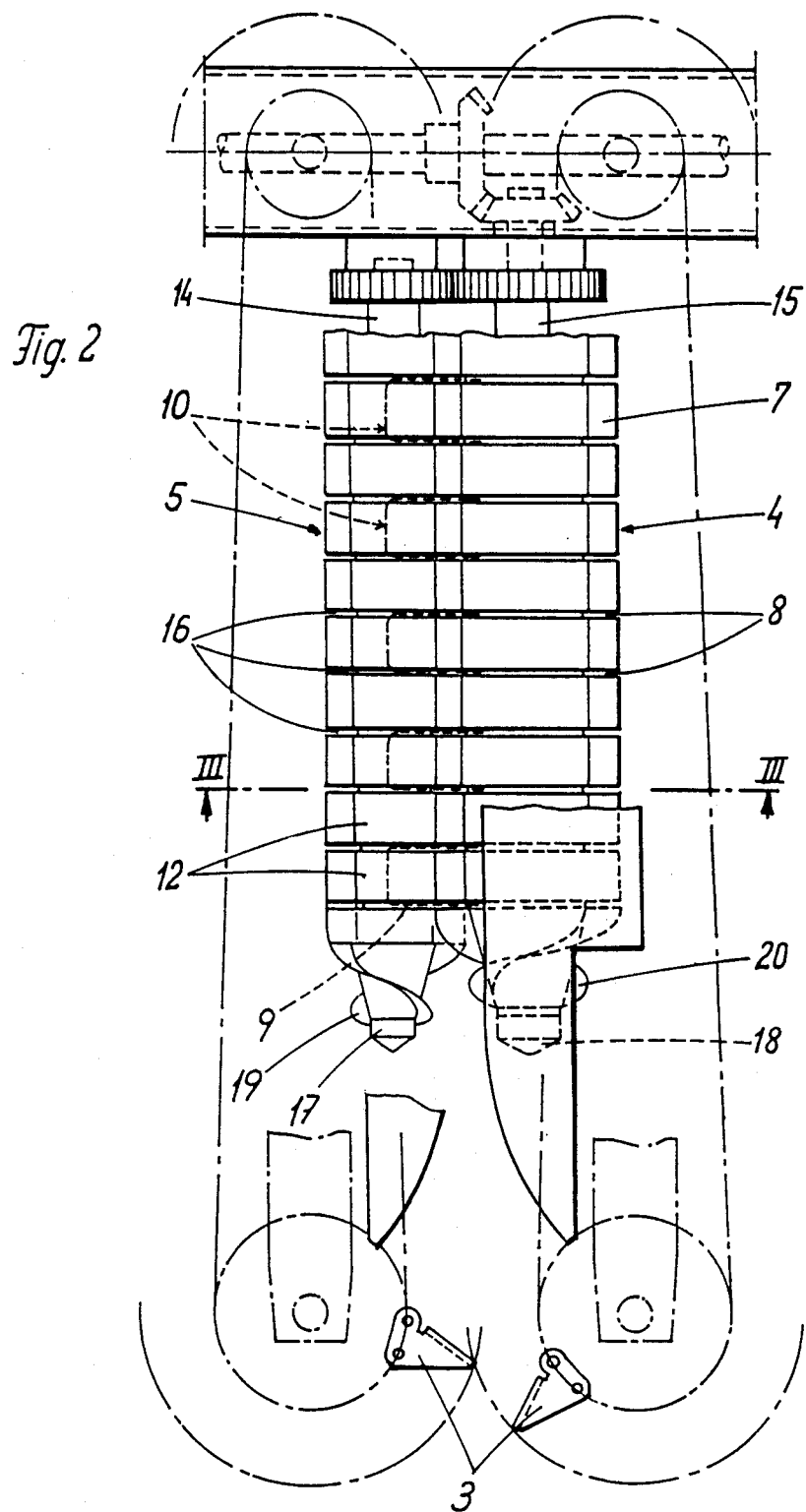
FIG. 2 is a plan view of a picking roller with an associated counter roller.

As can be seen from FIG. 2, both rollers 4 and 5 have tips 17 and 18. The tips are arranged at the front ends of the rollers 4 and 5 and provided with helical plates 19 and 20. Thereby the drawing or the stalk receipt is improved.

Figure 3:
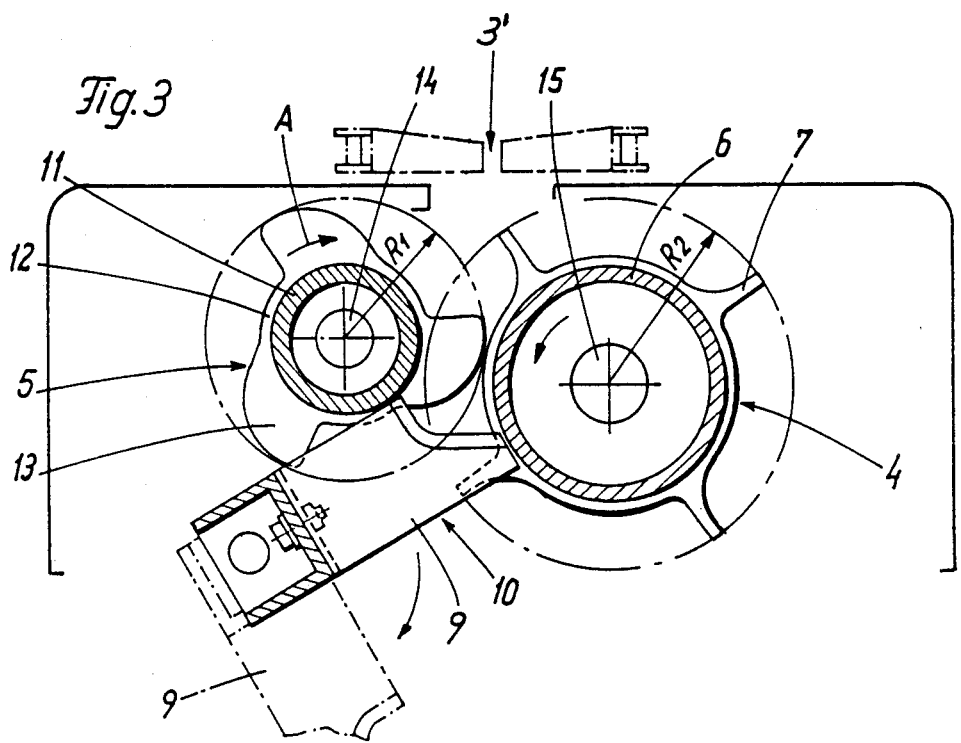
FIG. 3 is a view showing a section taken along the line III—III in FIG. 2.
Figure 4:
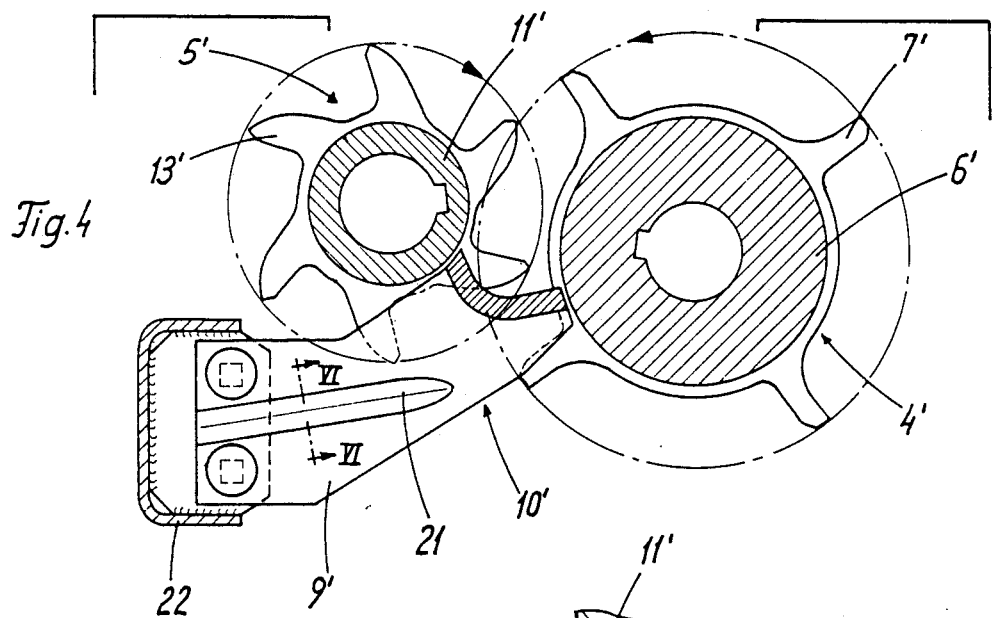
FIG. 4 is a view substantially corresponding to the view of FIG. 3 but showing a further embodiment of the present invention.

FIG. 4 shows an embodiment which is different from the embodiment of FIG. 3. Here a counter roller 5' is provided with six vanes 13', therefore the ratio of the rotary speed of the counter roller 5' to the drawing roller 4' is 4:3. This means that in the region in which the outer circumference of the counter roller and the drawing roller intersect one another, always two vanes 13' of the counter roller 5' are engaged in the intermediate space between two neighboring impact plates 7' of the drawing roller 4. Thereby a more reliable pressing of the stalk to be comminuted in direction toward the drawing roller is obtained.

Figure 5:
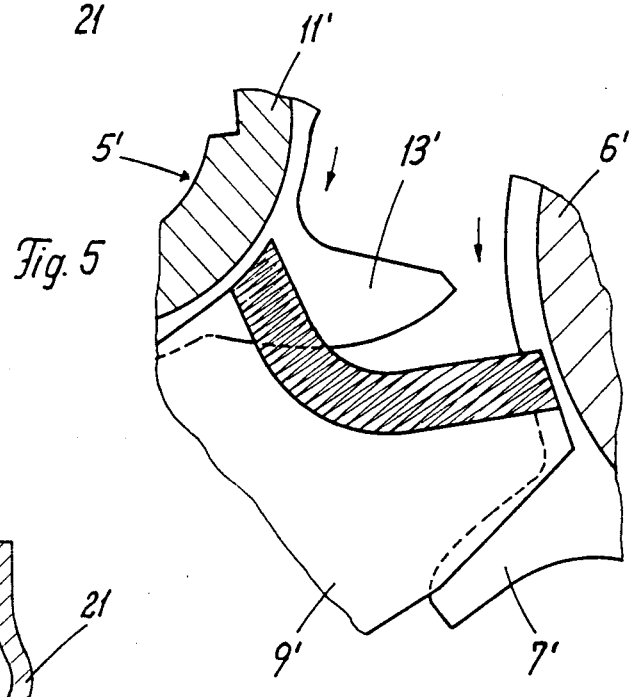
FIG. 5 is a view showing a part of the view of FIG. 4 on an enlarged scale.
Figure 6:
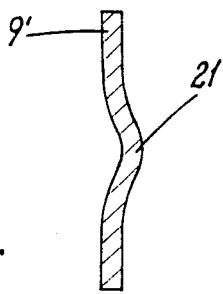
FIG. 6 is a view showing a section taken on the line VI—VI in FIG. 4.

As can be seen further from FIGS. 4 and 5, the cutters 9' correspond in their front region to the radius of the main body 11'. This prevents clamping of the stalk product between the main body 11' and the freely running regions of the cutter 9' in the event of favorable harvesting conditions. When needed, the cutters 9' can also correspond to the radius of the main body 6' in the region of the main body 6' of the drawing roller 4'.

In order to prevent collision of the stalk product with a holder 22 for the cutter block 10', it is laterally offset relative to the main body 11' of the counter roller 5' and farther than in the embodiment of FIG. 3. With such a considerable offset, correspondingly longer cutters 9' can be used. A crease 21 is pressed in each cutter. The crease reinforces and stabilizes the cutters to prevent their vibration.

It will be understood that each of the elements described above, or two or more together, may also find a useful application in other types of constructions differing from the types described above.

While the invention has been illustrated and described as embodied in an agricultural machine, particularly a harvester thresher for corn harvesting, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A harvesting implement for harvesting of corn and other grain products, to be arranged in front of a harvester thresher, the harvesting implement comprising for each a plant row driven drawing roller having a substantially cylindrical main body and a plurality of impact plates provided with cutouts; a cutting block provided with cutting means extending through said cutouts; and a counter holder associated with said drawing roller, said counter holder being formed as a driven counter roller which is axes parallel to said drawing roller, said counter roller including a main body with a plurality of segments spaced from one another, said drawing roller and said counter roller being both associated with said one common cutting block, said cutting means of said cutting block including a plurality of cutters which extend simultaneously in intermediate spaces between said segments of said counter roller and in said cutouts of said impact plates of said drawing roller.

2. A harvesting implement as defined in claim 1, wherein said drawing roller and said counter roller have axes which are spaced from one another by a predetermined distance, said distance being smaller than a sum of radii of circumferences of said drawing roller and said counter roller.

3. A harvesting implement as defined in claim 1, wherein each segment of said counter roller has at least three vanes, said vanes having vane portions operating for drawing and inclined rearwardly relative to a direction of rotation of said counter roller.

4. A harvesting implement as defined in claim 3, wherein said vane portions of said vanes are inclined rearwardly in an arcuate fashion.

5. A harvesting implement as defined in claim 1, wherein said drawing roller and said counter roller are each provided with front tips having helical plates.

6. A harvesting implement as defined in claim 5, wherein said tips of said drawing roller and counter roller have a conical shape.

7. A harvesting implement as defined in claim 1, wherein a diameter of a circumference of said counter roller is smaller than a diameter of a circumference of said drawing roller.

8. A harvesting implement as defined in claim 1, wherein said drawing roller and said counter roller are arranged so that a vertical central plane between said drawing roller and said counter roller is laterally offset toward a vertical central plane of said drawing roller.

9. A harvesting implement as defined in claim 1, wherein said drawing roller has four said impact plates, said counter roller having six said vanes.

10. A harvesting implement as defined in claim 1; and further comprising means for driving said counter roller and said drawing roller, so that said counter roller is driven with a higher rotary speed than said drawing roller.

11. A harvesting implement as defined in claim 1; and further comprising means for driving said counter roller and said drawing roller so that a ratio of rotary speeds of said counter roller and said drawing roller amount to 4:3.

12. A harvesting implement as defined in claim 1, wherein said cutting means include a plurality of rollers having a freely rotatable region and corresponding in said region to a radius of said main body of said counter roller.

13. A harvesting implement as defined in claim 1, wherein said cutting means include a plurality of rollers having a freely rotatable region and corresponding in said region to a radius of said main body of said drawing roller.

14. A harvesting implement as defined in claim 1, wherein said cutting means include a plurality of cutters each provided with a reinforcing crease.

15. A harvesting implement as defined in claim 1; and further comprising a holder for said cutting block, said holder being laterally offset outwardly toward said main body of said counter roller.

* * * * *